Figure 13:
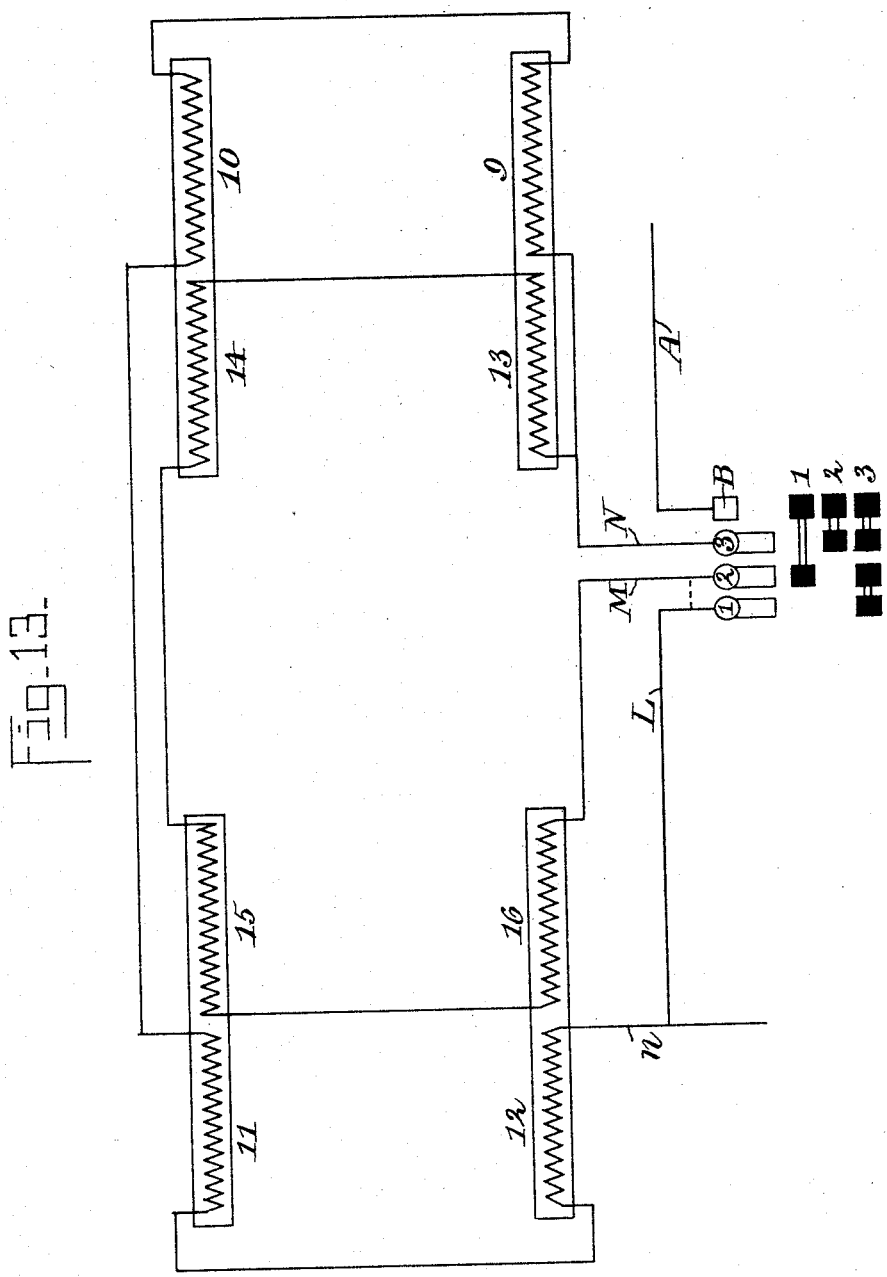

(No Model.) 4 Sheets—Sheet 1.
J. F. McELROY.
ELECTRIC SWITCH.
No. 586,933. Patented July 20, 1897.
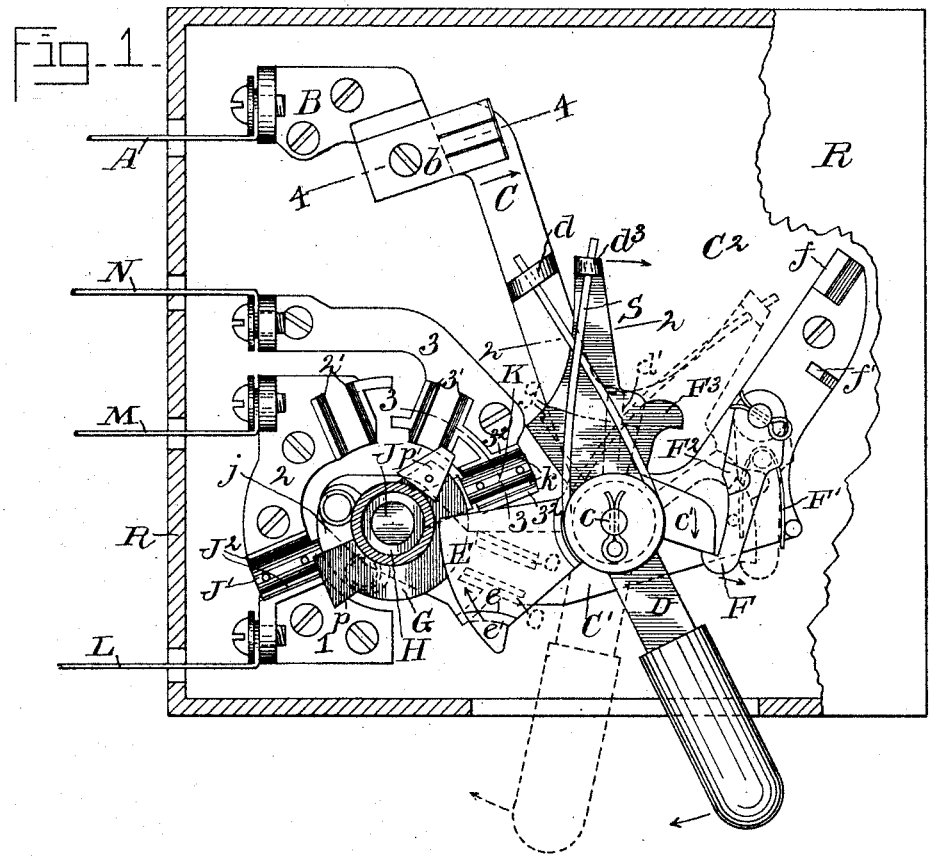
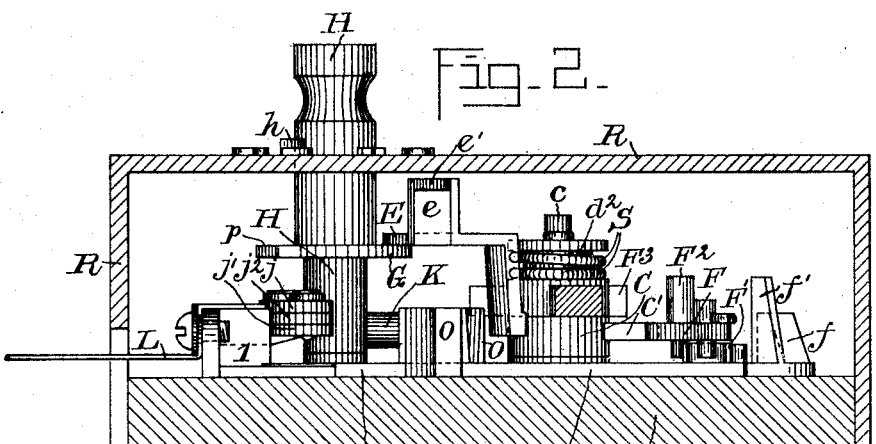
Witnesses
J. W. Fisher
W. J. Brown
Inventor,
James F. McElroy
by Ward & Cameron
Attorneys (No Model.) 4 Sheets—Sheet 2.
J. F. McELROY.
ELECTRIC SWITCH.
No. 586,933. Patented July 20, 1897.
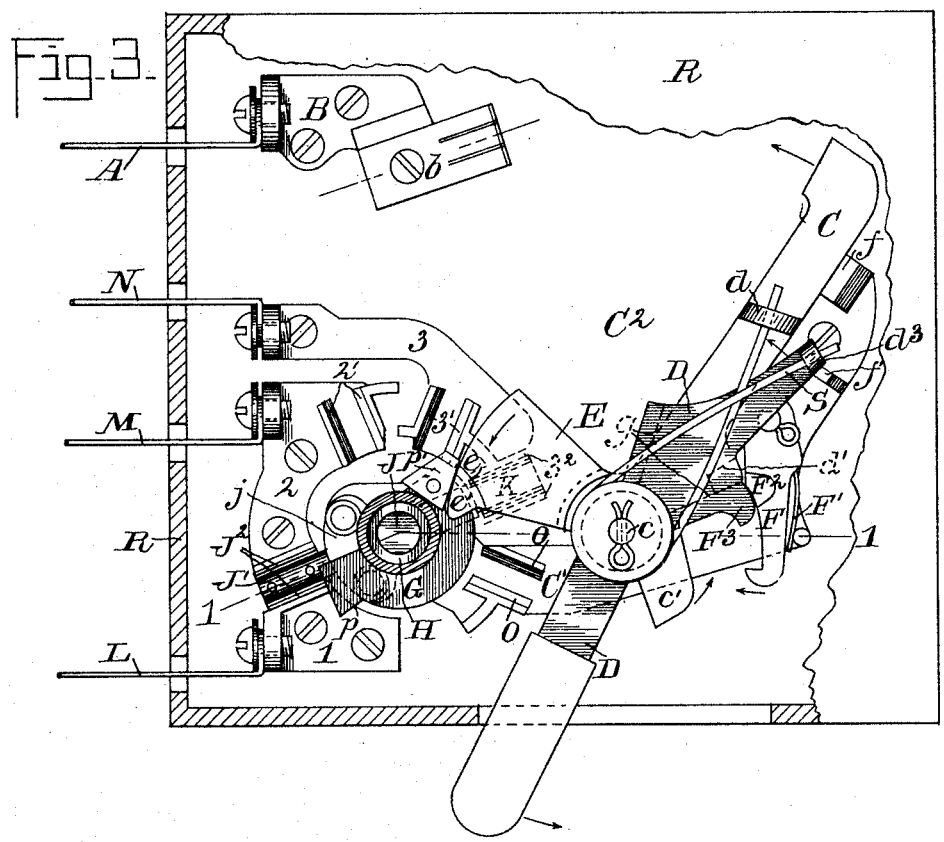
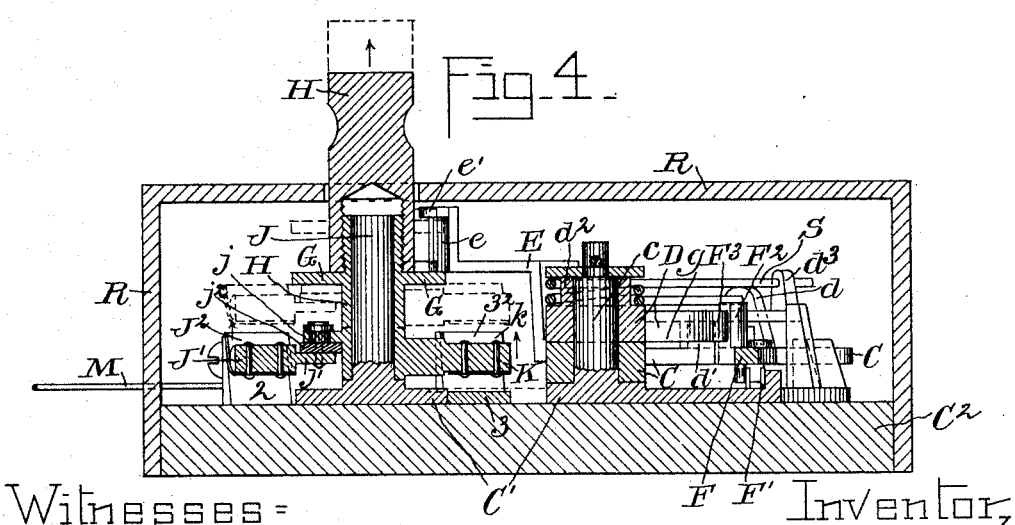

(No Model.) 4 Sheets—Sheet 3.
J. F. McELROY.
ELECTRIC SWITCH.
No. 586,933. Patented July 20, 1897.
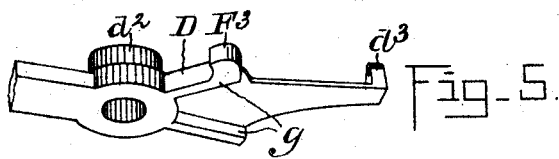
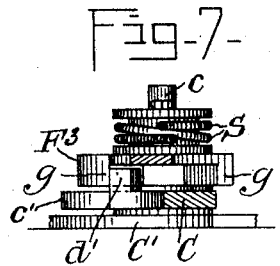
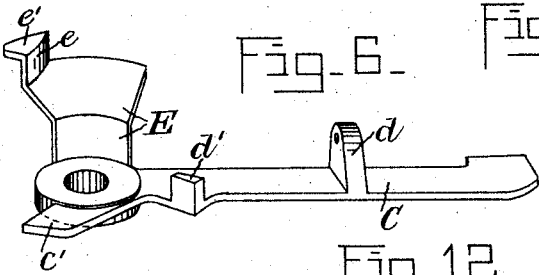
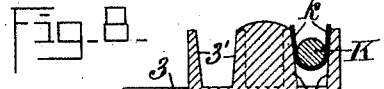
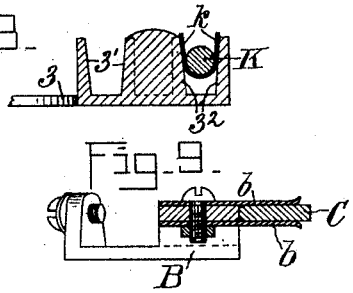
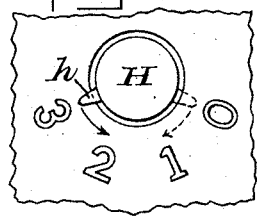
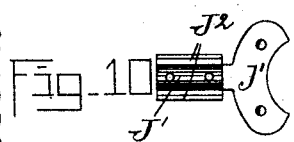
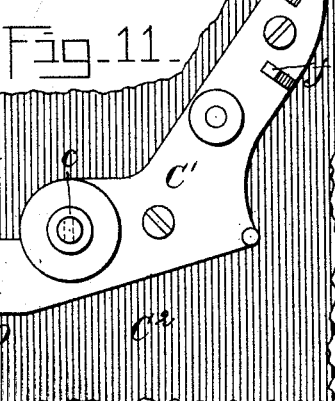
Witnesses:
J. W. Fisher
W. G. Brown
Inventor
James F. McElroy,
by Waldo Cameron
Attorneys (No Model.) 4 Sheets—Sheet 4.

J. F. McELROY.
ELECTRIC SWITCH.

No. 586,933. Patented July 20, 1897.

Witnesses:
J. W. Fisher
W. G. Brown

Inventor
James F. McElroy,
by Ward & Cameron
Attorneys

UNITED STATES PATENT OFFICE.

JAMES F. McELROY, OF ALBANY, NEW YORK.

ELECTRIC SWITCH.

SPECIFICATION forming part of Letters Patent No. 586,933, dated July 20, 1897.

Application filed January 9, 1896. Serial No. 574,829. (No model.)

*To all whom it may concern:*

Be it known that I, JAMES F. McELROY, a citizen of the United States, residing in the city and county of Albany and State of New York, have invented a new and useful Improvement in Electric Switches, of which the following is a specification.

My invention relates to devices for directing and controlling the distribution of electricity; and the object of my invention is to produce an electric switch so adjusted and arranged that the current of electricity may be conducted to the electric heaters or other desired destination for work in a predetermined direction and held positively and rigidly in the position in which it is placed until it is desired to break the connection, which breaking may be accomplished forcibly and abruptly previous to the possible movement of the fingers connecting the points of distribution of the switch. I attain this object by means of the mechanism illustrated in the accompanying drawings, in which—

Figure 1 is a plan. Fig. 2 is an elevation, the enveloping box in section. Fig. 3 is a plan showing the switch open. Fig. 4 is a section along the line 1 1 on Fig. 3. Fig. 5 is a detail view of the operating-lever. Fig. 6 is a detail view of the connecting-lever. Fig. 7 is a section along the line 2 2 on Fig. 1, looking toward the front of the machine. Fig. 8 is a section along the line 3 3 on Fig. 1. Fig. 9 is a section along the line 4 4 on Fig. 1. Fig. 10 is a plan of the finger-arm. Fig. 11 is a plan view, partly broken away, illustrating by diagram the possible movements of the switch. Fig. 12 is a view of the enveloping box, showing the end of the finger-carrying post H; and Fig. 13 shows the method of arranging the electric heaters in a car.

Similar letters and figures refer to similar parts throughout the several views.

The wire A carries the current to the pole B, which pole is provided with two plates $b\ b$, arranged in such a manner that there will be a space between the plates $b\ b$ within which the connecting-lever C may enter. The connecting-lever C is pivoted on the post $c$, secured to the plate C', and has projecting therefrom beyond the pivotal point a trigger-catch $c'$. I also arrange on the connecting-lever the upwardly-projecting lug $d$ and the stop-lug $d'$. Attached to or forming a part of the connecting-lever C, near its pivotal point, is the upwardly-projecting wing E, the wing E usually extending above the connecting-arm $a$ short distance and then bent at nearly a right angle for the purpose of coming in contact with and resting upon the plate G, attached to the finger-carrying post H, when the fingers are in contact.

The plate C' is secured to a suitable block $C^2$ and has at one end the stop-lugs $f\ f'$. Said plate also carries a trigger F, suitably mounted, operated by a spring F', adapted to hold the trigger in contact with the trigger-catch $c'$ when the connecting-lever C is in contact with the pole B. Attached to the trigger F is the operating-lug $F^2$, arranged to be operated upon by the lug $F^3$, attached to the side of the operating-lever D, so arranged that the lug $F^3$ will when the operating-rod is moved to almost the limit of its movement force the trigger from contact with the connecting-lever.

The operating-lever D is pivoted on the post $c$ and is provided at one end with a handle, its other end having a projecting lug $d^3$, within which is secured one end of a spring S, said spring being wound about the hub $d^2$ of the operating-lever D, the other end of the spring being secured to the lug $d$ on the connecting-lever C. As thus arranged the movement of the operating-lever in the direction shown by the arrow in Fig. 1 will tend to exert tension upon the spring, the end attached to the lug $d$ on the connecting-lever C being held rigidly in place. A continued movement of the operating-lever releases the trigger F, which leaves the connecting-lever unsecured, when the resiliency of the spring will force the connecting-lever abruptly away from the pole B, when it will come into contact with the lug $f$ on the plate C'. The operating-lever is stopped by the lug $f'$. When the operating-lever is moved to the position shown in full lines in Fig. 1, it will force the connecting-lever into position in contact with the pole by means of the downwardly-projecting arms $g\ g$ on the bottom of the operating-lever D, coming in contact with the lug $d'$ on the connecting-lever C.

To the plate C', I secure near one end thereof a post J, upon which I mount the finger-carrying post H, which has on one side thereof a plate $j$, to which is attached a plate $j'$, insulated from the plate $j$ by means of suitable insulating material $j^2$, rubber preferred, said plate $j'$ having a projecting arm J', carrying fingers $J^2$. The finger-carrying post H on the side opposite to that to which the plate $j$ is secured has an arm K, carrying fingers $k$, suitably secured thereto in electrical contact therewith. The plate C' is provided with the contact-posts O O, adapted to receive the fingers on the arm J', which are insulated from the post H, as already described. I also arrange on the block $C^2$ the plate I, to which I attach a wire L. Adjacent thereto, but separated therefrom sufficiently to allow for the insertion of the fingers $J^2$ on the arm J', I arrange a plate 2, to which plate is connected the wire M, which plate also is provided with the contact-plates 2', adapted to receive the fingers $k$. On the block $C^2$, I arrange the metallic plate 3, attached to which is the wire N and upon which I have two sets of contact-plates 3' $3^2$, adapted to receive the fingers $k$.

To the finger-carrying post H, I arrange a semiannular limiting-plate G, which has projecting lugs $p\,p'$, one at each end thereof, for the purpose of limiting the motion of the finger-carrying post H by coming in contact with the projecting lug $e$ on the arm E. The overlapping wing $e'$, secured to the lug $e$, limits the upward movement of the finger-carrying post H when contact is broken between the fingers and their respective plates.

I place an enveloping case R around the switch, secured usually to the block $C^2$, which block forms the support of the mechanism when ready for use. The finger-carrying post H extends through the front of the case R and is provided with a pointer $h$, and arranged on the face of the case R, I place the numerals "0," "I," "II," "III," so arranged that the position of the pointer on the finger-carrying post will indicate by referring to said numerals the position of the fingers in relation to the contact-plates.

The handle of the operating-lever D projects through a slotted opening in the side of the case R, allowing for the movement of said handle for the purpose of making and breaking the contact with the pole.

In Fig. 13 I have shown eight electric heaters placed within a car, four on each side, connected up in the following manner: Heaters 9, 10, 11, and 12 are connected by the wire N to the plate 3, are connected with each other, and the heater 12 connected with the wire $n$ to the ground. Heaters 13, 14, 15, and 16 are connected with each other and 13 connected with wire N and heater 16 connected with the wire M, attached to the plate 2. The ground-wire $n$ is attached to the wire L, which is connected with plate 1. As thus arranged, when the finger-carrying post H is in the position indicated as O on Fig. 12, the fingers $J^2$ are in contact with the contact-plates O O, and the current passing through the connecting-lever into the plate C' in contact with the fingers $J^2$ cannot be carried by the fingers K. The fingers $k$, which are in electrical contact with the arms K, being entirely disconnected and prevented from touching either of the contact-plates because of the insulated fingers $J^2$ being between the plates O O, and no current is conducted to the heaters.

When the operating-handle is turned so as to release the connecting-lever C from the pole B, the post H may be raised, removing the fingers $k$ and $J^2$ from their contacts, and the finger-post may be revolved to one of the positions illustrated in Fig. 12, when by pressing the finger-post the connection may be made, which will be the one indicated on the case. After the proper connection has been made the operating-handle is turned, causing the connection between the connecting-lever C and the pole B. This operation will bring the wing E in contact with the ring G, which holds the connecting-fingers in position between their respective connecting-plates.

When the indicator is placed at "I," the current is carried from the plate C' to plate 2 and conducted by wire M to heaters 16, 15, 14, and 13 through the wire N to heaters 9, 10, 11, and 12 to the ground, all of the heaters being in circuit. When the indicator shows the position to be "II," the fingers are in contact with the plate 3, conducting the current through the wire N to heaters 9, 10, 11, and 12 and out at the ground, four of the heaters being in circuit. When the position is that indicated by "III," the fingers $k$ are in contact with the plate 3 and the fingers $J^2$ are in contact with plates 1 and 2 and the current is through wire N to heaters 13, 14, 15, 16, 9, 10, 11, and 12, returning through wire M to plate 2, traversing the plate, across the fingers $J^2$ to plate 1, through the wire L to the ground, the heaters being in multiple series.

I indicate on Fig. 13 the positions of the switch when the indicator on the finger-carrying post is at the position of the numerals "I," "II," and "III," respectively.

What I claim as my invention, and desire to secure by Letters Patent, is—

1. In an electric switch, the combination of a snap-switch for opening the circuit, with an adjusting-switch consisting of terminal blocks fixedly arranged around a vertical post, conducting-pieces for varying the connection attached to a carrier which rotates on said vertical post, means for connecting said carrier to the electric switch, whereby the electric switch locks the adjusting-switch when the electric switch is closed and unlocks same when open, substantially as described and for the purpose set forth.

2. In an electric switch, the combination of a snap-switch for opening the circuit with an adjusting-switch, the terminal blocks of the adjusting-switch being fixedly arranged around the vertical post, conducting-pieces for varying the connections attached to the carrier, pivoted on said post and having a rotary and longitudinal motion thereon, and locking means for connecting the electric switch and the adjusting-switch, substantially as described and for the purpose set forth.

3. In an electric switch, the combination of a snap-switch, a wing attached to the side of the snap-switch bar, an adjusting-switch composed of a contact-carrying post adapted to move longitudinally and rotate upon a standard attached to the metallic plate connected with the lever-arm of the snap-switch, an annular plate on said contact-carrying post adapted to engage with said wing on said lever-arm when the snap-switch is closed, suitable contact-points with which said contact-carrying post engages, substantially as described and for the purpose set forth.

4. In an electric switch, the combination of a snap-switch, with an adjusting-switch composed of a contact-carrying post, a metallic standard upon which said post is adapted to rotate and move longitudinally, a metallic plate carrying said standard and connected with the contact-lever of said snap-switch, said contact-carrying post provided with a contact-finger insulated from said post, with a contact-finger connected with said post, contact-blocks arranged in such a manner that the said fingers may be connected therewith at the points desired with wires connecting said blocks with the work to be performed, with a means for interlocking said snap-switch and said adjusting-switch, substantially as described and for the purpose set forth.

5. In an electric switch, the combination of a snap-switch with an adjusting-switch composed of a contact-carrying post, a metal standard upon which said post is adapted to rotate and move longitudinally, a metal plate carrying said standard and connected with the contact-lever of said snap-switch, said contact-carrying post provided with contact-fingers, one of which is electrically connected to said post and one insulated from said post, contact-blocks arranged in such a manner that said fingers may be connected therewith at the points desired, with wires connecting said blocks with electric heaters, so arranged that by placing the adjusting-switch in the position indicated by O no current is connected to the heaters, when the indicator is placed at the numeral 1 the heaters in the different circuits are placed in series, when the position of the indicator is at the numeral 2 half of the heaters are in multiple series, and when the indicator is placed at the numeral 3 all of the heaters are placed in multiple series, substantially as described and for the purpose set forth.

JAMES F. McELROY.

Witnesses:
   H. J. NODINE,
   MARY AGNES BURKE.